Oct. 11, 1927.   1,645,466
A. WESTLAKE
GALLEY STOVE TONGS
Filed May 26, 1927   2 Sheets-Sheet 1
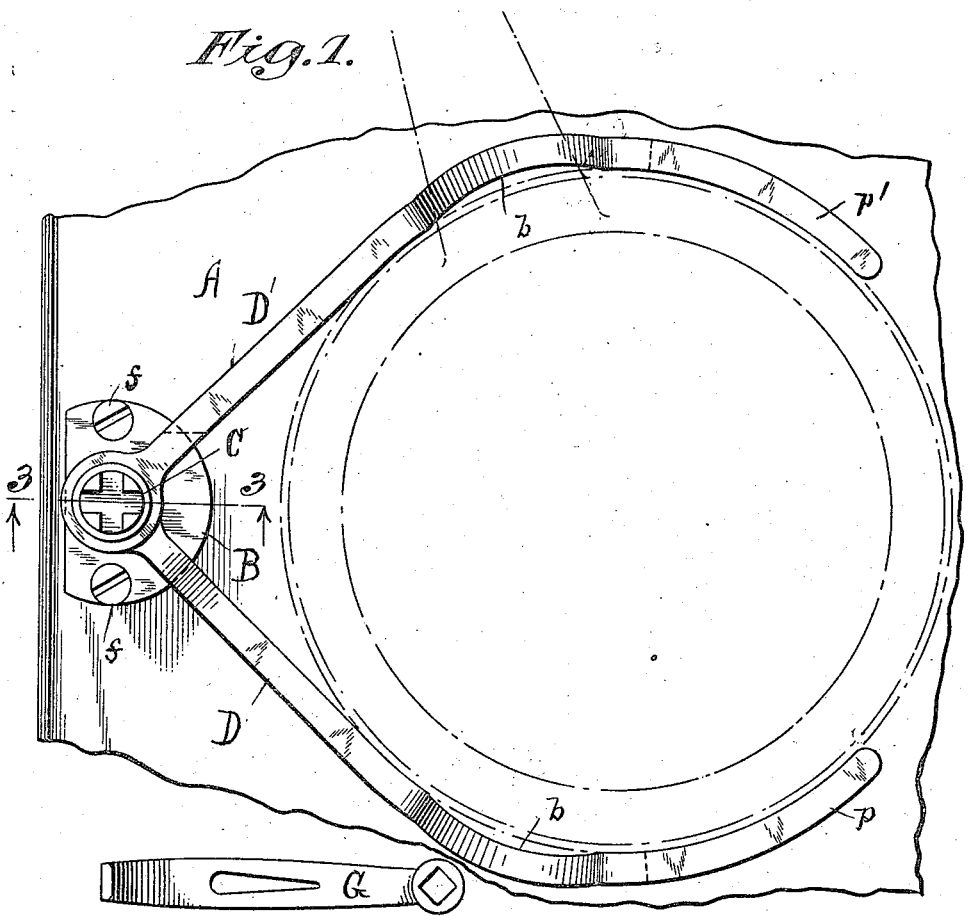
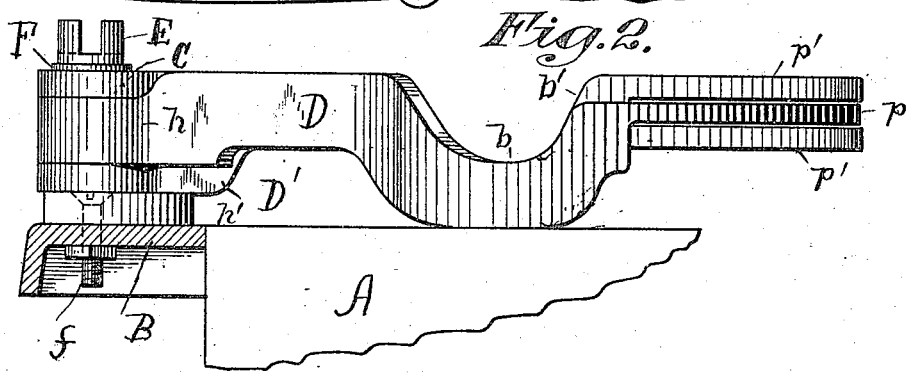
Albert Westlake Inventor
By his Attorney
W. P. Preble

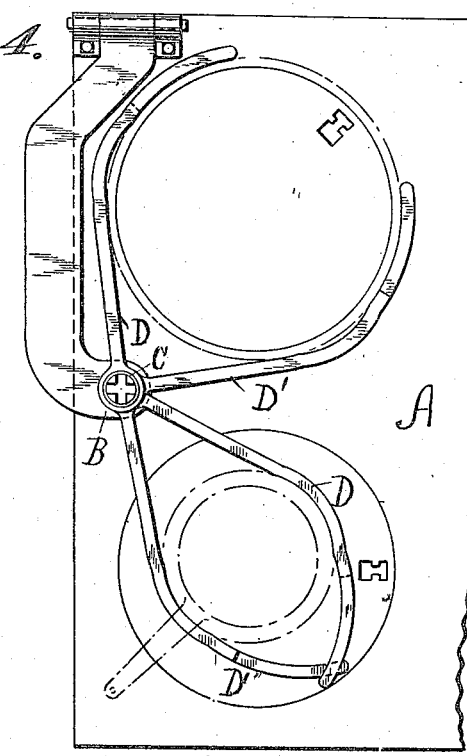
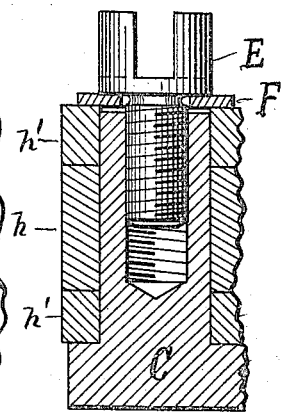
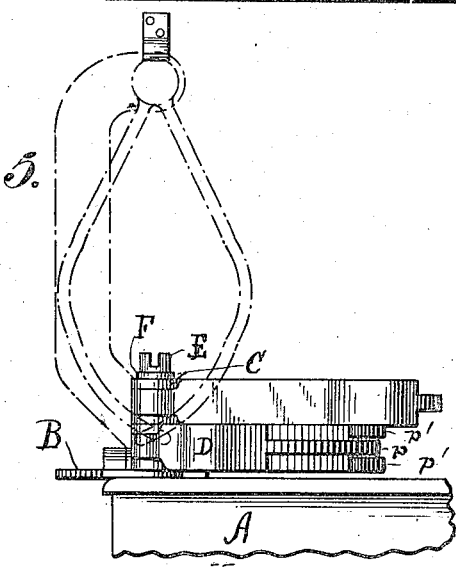
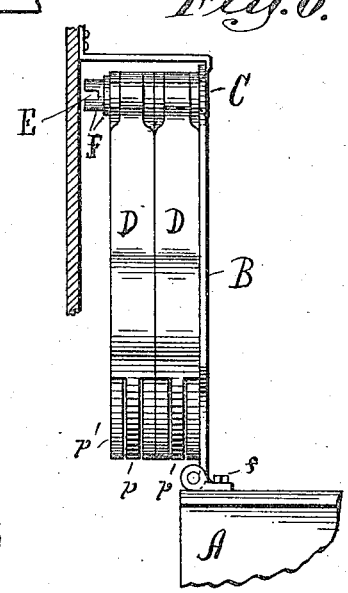

Patented Oct. 11, 1927.

1,645,466

UNITED STATES PATENT OFFICE.

ALBERT WESTLAKE, OF NEW YORK, N. Y.

GALLEY-STOVE TONGS.

Application filed May 26, 1927. Serial No. 194,270.

My invention relates, especially, to tongs which are intended to maintain in place upon the galley stove of a yacht or other sailing vessel, the frying pans, stew-pots, and other cooking utensils, securely without danger of slipping or spilling when the vessel rolls, pitches, or otherwise fails to keep an even keel.

But, obviously, these tongs may be mounted on or near any sort of stove, or cooking apparatus, whether stationary or liable to a rocking, shaking, or tipping motion, or otherwise, wherever it becomes convenient for the pots, pans, or other utensils to be swung over or away from the centre of heat, or fire, without lifting them by hand.

As applied to galley-stoves the chief advantages of my improved stove-tongs are:—

They greatly simplify the art of cooking with a stove on a rocking or tipping boat. They do away with the need of tying the pots and pans down on the stove with wire or wire-hooks as heretofore practised. They keep the pots and pans on the galley stove quiet and avoid splashing and spattering of liquid or semi-liquid contents. They may be locked in place on the stove or out of the way when not in use. No other key is needed to lock and unlock these tongs than the sharp end of an ordinary stove-cover-lifter.

These stove tongs may be made almost indestructible without impairing their efficiency. Two or more pairs of tongs may be mounted to operate at the same time with a single stove, one pair for each stove burner, if desired, without interfering with each other.

The most convenient type of my galley-stove tongs, which I have yet devised is shown in the accompanying drawings, but the form of tongs, as well as the material of which they are made, may be largely varied at pleasure, without departing from the principle of my invention.

Figure 1, is a top view of the tongs clasping a pan on the top of the stove.

Figure 2, is a side view of the tongs shown in Figure 1.

Figure 3, is a section on lines 3—3 of Figure 1, showing the locking device of the tongs.

Figure 4, is a top view of a double pair of tongs, each pair clasping a vessel of different size or location.

Figure 5, is a side view of the double pair of tongs shown in Figure 4, and also showing, in dotted lines, the position in which the tongs may be hung when not in use.

Figure 6, is a side view of the double tongs when hung out of use.

A, represents a stove-top, the outlines being broken away. B, is the base-plate of the tongs,—provided with an upright, internally-threaded post C, on which the tong-legs, D, D, are revolubly mounted. E, is a lock-nut and F, a washer. The base-plate may be easily attached to and removed from the top of the stove by means of the screw-bolts $f, f$, as occasion requires.

G, represents a wrench, or stove-cover-lifter, by means of which the tongs may be locked into a fixed, desired position upon the post, and unlocked when desired.

The shape and size of the tong-legs, shown for the purpose of illustration, may be largely varied according to taste, and practical requirements. As shown they are somewhat thin, but long and strong, arms provided at one end with a suitable hub which encircles the post C, and at the other end with a single or double prong,—and near the middle of the arm, a bay-shape curvature, adapted to clasp the vessel, to be held by the tongs, more effectively. It is desirable that, as shown, the hub $h$, of one of the arms, as D, should be able to slide between the two tongs of the other hub $h'$, of the other arm, D'.—and that, similarly, the prong $p$, of arm D, should be able to slip through the forked prong $p'$ of arm D'. This interlocking of prongs permits a much larger range of grasp in closing upon the vessel to be held, and consequently adapts itself to a much greater variation in sizes of vessel to be so held. The bay-like curvatures $b, b'$, however, may, preferably, be rights and lefts, but otherwise similar in size and shape.

I claim:—

Galley-stove tongs which comprise a supporting base, clasping-arms revolubly mounted thereon, and adapted to be turned into overlapping position toward each other whereby they may hold an article placed there-between, and means for retaining said arms in said holding relation when desired.

ALBERT WESTLAKE.